United States Patent
Pacher et al.

(10) Patent No.: US 8,244,082 B2
(45) Date of Patent: Aug. 14, 2012

(54) DEVICE FOR GENERATING POLARIZATION-ENTANGLED PHOTONS

(75) Inventors: Christoph Pacher, Vienna (AT); Norman Finger, Starnberg (DE)

(73) Assignee: Austrian Research Centers GmbH—ARC, Vienna (AT)

( * ) Notice: Subject to any disclaimer, the term of this patent is extended or adjusted under 35 U.S.C. 154(b) by 842 days.

(21) Appl. No.: 12/252,891

(22) Filed: Oct. 16, 2008

(65) Prior Publication Data

US 2009/0103736 A1    Apr. 23, 2009

(30) Foreign Application Priority Data

Oct. 17, 2007    (AT) ................ A 1669/2007

(51) Int. Cl.
*G02B 6/00* (2006.01)
(52) U.S. Cl. .............. 385/15; 385/11; 359/246
(58) Field of Classification Search .......... None
See application file for complete search history.

(56) References Cited

U.S. PATENT DOCUMENTS

| | | | |
|---|---|---|---|
| 6,424,665 B1 | 7/2002 | Kwiat et al. | 372/21 |
| 2003/0002127 A1* | 1/2003 | George | 359/246 |
| 2008/0063015 A1 | 3/2008 | Trifonov et al. | 372/18 |

FOREIGN PATENT DOCUMENTS

| | | |
|---|---|---|
| JP | 2005-258232 | 9/2005 |
| WO | WO 2008/039261 | 4/2008 |

OTHER PUBLICATIONS

Altepeter et al., "Phase-compensated ultra-bright source of entangled photons," *Optics Express*, 13:8951, 2005.
Asobe et al., "A highly damage-resistant Zn:LiNbO$_3$ ridge waveguide and its application to polarization-independent wavelength coverter," *IEEE Journal of Quantum Electronics*, 39:1327-1333, 2003.
Dušek et al., "Quantum cryptography," In: *Progress in Optics*, 49:381, 2006.
Fiorentino et al., "Compact sources of correlated and entangled photons," *Proc. of SPIE—The International Society for Optical Engineering—Quantum Communications and Quantum Imaging*, 6710, 2007.
Gisin et al., "Quantum cryptography," *Rev. Mod. Phys.*, 74:145-195, 2002.
Jiang and Tomita, "Highly efficient polarization-entangled photon source using periodically poled lithium niobate waveguides," *Optics Commun.*, 267:278, 2006.

(Continued)

*Primary Examiner* — Tina Wong
(74) *Attorney, Agent, or Firm* — Fulbright & Jaworski L.L.P.

(57) ABSTRACT

A device for generating polarization-entangled photons by means of parametric down-conversion, comprising a waveguide structure formed in a substrate of an optically non-linear material with periodically poled regions, wherein, when in operation, pump photons can be supplied from a pump laser to the waveguide structure, and wherein a separating means for separating the entangled photons for the separate further conduction of signal photons and idler photons, respectively, is arranged to follow the waveguide structure.

12 Claims, 4 Drawing Sheets

OTHER PUBLICATIONS

Jiang and Tomita, "The generation of polarization-entangled photon pairs using periodically poled lithium niobate waveguides in a fibre loop," *J. Phys. B.*, 40:437, 2007.

Kurtsiefer et al., "High efficiency entangled photon pair collection in type-II parmetric fluorescence," *Phys. Rev. A.*, 64: 023802, 2001.

Kwiat et al., "Ultra-bright source of polarization-entangled photons," *Phys. Rev. A.*, 60:773-776, 1999.

McCaughan, "Low-loss polarization-independent electrooptical switches at $\lambda=1.3\mu m$," *Journal of Lightwave Technology*, LT-2:P51-55, 1984.

Roussev et al., "Periodically poled lithium niobate waveguide sum-frequency generator for the efficient single-photon detection at communication wavelengths," *Optic Letters*, 129:1518-1520, 2004.

Tanzilli et al., "PPLN waveguide for quantum communication," *Eur. Phys. J. D.*, 18:155-160, 2002.

Xie and Fejer, "Two-spatial-mode parametric amplifier in lithium niobate waveguides with asymmetric Y junctions," *Optic Letters*, 31:799-801, 2006.

* cited by examiner

DEVICE FOR GENERATING POLARIZATION-ENTANGLED PHOTONS

BACKGROUND OF THE INVENTION

The invention relates to a device for generating polarization-entangled photons by means of parametric down-conversion, comprising a waveguide structure formed in a substrate of an optically non-linear material with periodically poled regions, wherein, when in operation, pump photons can be supplied from a pump laser to the waveguide structure, and wherein a separating means for separating the entangled photons for the separate further conduction of signal photons and idler photons, respectively, is arranged to follow the waveguide structure.

1. Field of the Invention

Devices for generating polarization-entangled photons are particularly used in quantum-cryptographic devices when generating a quantum key. In detail, quantum cryptography designates the technique of creating and distributing symmetric secrets, wherein the security—being a measure for the confidentiality and the unadulteratedness of two identical bit sequences generated at two spaced-apart locations—can be mathematically exactly proven with methods of quantum information theory (information-theoretical security). The generated and distributed symmetric secrets can later on be used, e.g., as a key for symmetric cryptographic encryption methods. In contrast, there exists no such proof of the security of conventional key distribution systems that are based on asymmetric cryptography.

2. Description of Related Art

Quantum cryptography has been developed interdisciplinarily between the scientific fields of quantum physics, quantum optics, information theory, cryptography and information technology. A survey of the basics and methods as well as the historical development of quantum cryptography is contained in the articles by Gisin, N., G. Ribordy, W. Tittel, H. Zbinden, "Quantum Cryptography", 2002 Rev. Mod. Phys. 74, 145; and by Dušek, M., N. Lütkenhaus, M. Hendrych, "Quantum Cryptography", 2006, Progress in Optics, vol. 49, Edt. E. Wolf (Elsevier, 2006).

A conventional quantum-cryptographic link always comprises two stations, or apparatuses, respectively. In the literature, these stations commonly are termed ALICE and BOB components. These two stations set up at spaced-apart locations are connected by an optical quantum channel (fiberglass-bound or through free space) as well as by a conventional, classical, unencrypted, electronic communication channel, also termed public channel.

In its ALICE and BOB components, such a quantum-cryptographic connection continuously generates symmetric secrets (i.e. secrets identical in the ALICE and BOB components) which are delivered to the outside via data channels for further use, e.g. as a key in connected cryptographic systems.

In detail, in quantum cryptography, photons are exchanged between two partners, which photons contain quantum information. The two partners measure certain properties of these photons, such as, e.g., the plane of polarisation, obtain the same measurement results and, thus, are able of setting up an identical quantum key. Parts of the measurement results, such as, e.g., the exact points of time, are exchanged via public channels. In this manner, the two partners are able to exactly associate the individual measurements to each other.

In principle, there are two methods, i.e. the one using single photons and the one using entangled photons. In case of the single photon method, a partner generates a sequence of individual photons which are sent through a polarizer whose plane of polarization is randomly varied. The setting of the polarizer is transmitted to the other partner. If a photon is then registered by this other partner, its plane of polarization, too, will be unambiguously determined. With this method, however, it must be ensured that in fact always only one single photon is generated since if several photons of the same polarization are generated, a photon could be intercepted by a third party.

In the method of polarization-entangled photons, by a special technique two photons are simultaneously generated which contain the same quantum information. One photon each is sent to one of the two partners so that the two partners will simultaneously obtain an identical measurement result and, thus, each one of them can build the same quantum key for him/herself.

The basis of each device for generating entangled photons is the parametric down-conversion in a non-linear crystal in which pump photons (index p) are converted into so-called signal photons (index s) and idler photons (index i). Quantum-mechanically, the state $|p\rangle$ is converted into the product state $|s\,i\rangle$. What is responsible for this down-conversion process is the susceptibility sensor $\overset{\leftrightarrow}{\chi}^{(2)}$, which links the (square) non-linear polarization with the electric field E as follows:

$$P_i^{(2)}(t) = \sum_{j,k} \chi_{ijk}^{(2)} E_j(t) E_k(t)$$

For the temporal Fourier components of the fields, the following correlation will result:

$$P_i^{(2)}(\omega_3 = \omega_1 + \omega_2) = \sum_{j,k} d_{ijk}(-\omega_3, \omega_1, \omega_2) E_j(\omega_1) E_k(\omega_2)$$

wherein the relationship $\chi_{ijk}^{(2)} = 2d_{ijk}$ applies. When converting a pump photon into a signal photon and an idler photon, the conservation of the energy $\omega_p = \omega_s + \omega_i$ as well as the phase matching condition $\beta_{x,p} = \beta_{x,s} + \beta_{x,i}$ must be satisfied, wherein $\omega$ is the angular frequency and $\beta_x = \bar{n}\omega/c$ denotes the respective propagation constants. A wave propagation in x-direction has been assumed. $\bar{n}$ is the (effective) refraction index for the respective frequency/polarization of the electromagnetic wave, and c is the velocity of light in vacuum.

Since the phase matching condition Equation 1 cannot be met easily, it is suitable to use periodically poled crystals in which the ferro-electric domains having a poling period $\Lambda$ are alternatingly poled in the (+c) and (−c) direction of the crystal. Thus, during the down-conversion process, the quasi-phase matching condition $$\beta_{x,p} = \beta_{x,s} + \beta_{x,i} + m\frac{2\pi}{\Lambda} \qquad (2)$$

must be met, wherein in this case, coupling between the pump, signal and idler fields is effected via the $m^{th}$ Fourier component of the susceptibility tensor $\overset{\leftrightarrow}{\chi}^{(2)}$.

In a z-oriented lithium niobate (LiNbO$_3$) crystal, the largest non-linear coefficient is the coefficient $d_{33} = \chi_{333}^{(2)}/2$ which is linked with the type I down-conversion of a vertically (i.e. z-) polarized pump photon in vertically polarized signal photons and idler photons (transition $\omega_p{}^V \to \omega_s{}^V + \omega_i{}^V$). The non-linear coefficient which is responsible for the type I down conversion of a vertically polarized pump photon in horizontally polarized signal and idler photons (transition $\omega_p{}^V \to \omega_s{}^H + \omega_i{}^H$) is the coefficient $d_{31} = \chi_{311}{}^{(2)}/2$, the magnitude of which is only approximately one seventh of the magnitude of $d_{33}$.

Assuming a negligible exhaustion of the pump wave (i.e. the output of the pump wave $P_p$ remains approximately constant) and an ideal quasi-phase matching Equation 2, the efficiency $\eta$ of the down-conversion when passing a path having the length L can be expressed as $$\eta = \frac{N_i(L)}{N_s(0)} = \nu^2 \kappa_i^2 L^2 P_p \frac{\omega_s}{\omega_i}. \qquad (3)$$

Therein, $N_i(L)$ and $N_s(0)$, respectively, are the idler photon number at the output, and the signal photon number at the input; $\nu$ is the field overlap factor which describes the extent of the transversal overlapping of the pump fields, signal fields and idler fields, and $\kappa$ is the coupling factor. It has been assumed that the idler photon number at the input is zero. The photon number is linked to the electromagnetic output of the wave via the relationship $N = P/\eta\omega$. The coupling factor $\kappa_i$ is calculated as $$\kappa_i = \frac{\omega_i d_{\mathit{eff}}}{\sqrt{2\varepsilon_0 c^3 \bar{n}_p \bar{n}_s \bar{n}_i}},$$

wherein $d_{\mathit{eff}}$ is the $m^{th}$ Fourier component of the d-coefficient that is responsible for the down-conversion, and $\bar{n}_p, \bar{n}_s, \bar{n}_i$ are the (effective) refraction indexes for the pump, signal and idler waves; $\varepsilon_0$ is the dielectric constant of the vacuum.

The use of waveguides in non-linear optical components has the advantages of a pronounced local delimitation of the pump, signal and idler fields (increasing the field overlap factor $\nu$), a great interaction length and the possibility of an efficient electrooptical tuning. Such waveguide designs per se are prior art in non-linear optical devices, such as frequency mixers (cf. e.g. R. V. Roussev, C. Langrock, J. R. Kurz, M. M. Fejer, "Periodically poled lithium niobate waveguide sum-frequency generator for the efficient single-photon detection at communication wavelengths", Optics Letters, vol. 29, p. 1518 ff. (2004)), parametric oscillators (cf. e.g., X. Xie, M. M. Fejer, "Two-spatial-mode parametric amplifier in lithium niobate waveguides with asymmetric Y junctions", Optics Letters, vol. 31, p. 799 ff (2006)), and also sources for entangled photons (S. Tanzilli, W. Tittel, H. De Riematten, H. Zbinden, P. Baldi, M. De Micheli, "PPLN waveguide for quantum communication", Eur. Phys. J. D, vol. 18, p. 155 ff (2002).

So far, a number of different approaches have been used for generating polarization-entangled photons which quantum-mechanically correspond to a state of superposition $$|\Psi\rangle = \frac{1}{\sqrt{2}}(|s^H\rangle|i^H\rangle + |A|e^{i\varphi}|s^V\rangle|i^V\rangle) \qquad (4)$$

with a phase shift $\varphi$ between the horizontal and vertical states. Ideally, the constant $|A|$ should have the value one.

As shown in the article by C. Kurtsiefer, M. Oberpaierleiter and H. Weinfurter, "High-efficiency entangled photon pair collection in type-II parametric fluorescence", Phys. Rev. A, vol. 64, p. 023802 ff (2001), one possible way of generating polarization-entangled photons is the use of type-II down-conversion. The disadvantage of this method is the necessity of optical devices for compensating the temperature drift, whereby a compact set-up (such as, e.g., on a single optical chip) is not possible.

The realization of two-crystal configurations, wherein the generation of horizontally and vertically polarized photons occurs by means of type-I conversion in two consecutively arranged non-linear crystals rotated relative to each other by 90 degrees, has been described in the articles P. G. Kwiat, E. Waks, A. G. White, I. Appelbaum, P. H. Eberhard, "Ultra-bright source of polarization-entangled photons", Physical Review A, vol. 60, 773-776 (1999), and J. B. Altepeter, E. R. Jeffrey, P. G. Kwiat, "Phase-compensated ultra-bright source of entangled photons", Optics Express, vol. 13, p. 8951 ff, 2005. Furthermore, two-crystal configurations have been suggested in which periodically poled $LiNbO_3$ crystals were optically connected by means of fiberglass cables; cf. Y. K. Jiang, A. Tomita, "The generation of polarization-entangled photon pairs using periodically poled lithium niobate waveguides in a fibre loop", J. Phys. B, vol. 40, p. 437 ff. (2007).

In the publication Y. K. Jiang, A. Tomita, "Highly efficient polarization-entangled photon source using periodically poled lithium niobate waveguides", Optics Commun. vol. 267, p. 278 ff (2006), a source of photons is described which requires only one non-linear crystal. On the crystal, there are two spaced-apart wave-guides, vertically polarized photons being generated in each of them. For generating the horizontal polarization, one of these waveguides is followed by an external, fiber-coupled device for rotating the polarization.

For an efficient generation of photons with both polarizations, TM (vertically polarized) and TE (horizontally polarized), on one wafer, waveguides are required which support both TM modes and TE modes. Even though the SPE method (SPE—soft proton exchange) already addressed in the previous article by S. Tanzilli et al. (2002) is attractive with a view to obtaining PPLN waveguides (PPLN—periodically poled lithium niobate) with low losses, there do exist problems, since the proton exchange process only increases the extraordinary refraction index $n_e$, yet leaves the ordinary refraction index $n_o$ practically unchanged. Accordingly, when using this very well established technique, only waveguides that conduct TM modes can be obtained. As a remedy, titanium(Ti)- or zinc(Zn)-diffused or -doped waveguides have been provided which are capable of conducting both polarizations. Zn-doped waveguides are preferable, since Ti-diffused waveguides have the disadvantage of an increased susceptibility for optically induced damage.

SUMMARY OF THE INVENTION

It is now an object of the invention to provide a device for generating polarization-entangled photons which can be designed to be extremely compact, having comparatively small dimensions, in particular in the range of from 5 cm to 10 cm, and which, furthermore, is extremely robust and, moreover, offers advantageous tuning possibilities when generating the entangled photons. The invention is based on the finding that an efficient electrical and thermal tuning with regard to the quasi-phase matching condition (cf. the above equation (2)) can be achieved in the conversion $\omega_p{}^V \to \omega_s{}^H + \omega_i{}^H$. Since for the propagation constant, the relationship $\beta_x =$ ℏω/c holds, and the effective mode refraction index n̄ is substantially determined by the extraordinary/ordinary refraction index during the vertical and horizontal polarization, respectively, with highly different electrooptically and thermally induced index changes occurring, a comparatively broad tuning range can be attained.

Accordingly, for achieving the aforementioned object, the invention provides for a device of the initially defined kind, wherein the waveguide structure comprises two waveguides where, in operation, a portion α of the pump photons can be supplied to the one, or first waveguide via a beam splitter, and the remaining portion of the pump photons can be supplied to the other, or second waveguide via this beam splitter, the pump photons in one waveguide decaying into vertically polarized signal and idler photons, and in the other waveguide into horizontally polarized signal and idler photons which are supplied via a unifying path to a device for spectral separation of signal and idler photons; at least the second waveguide has an associated thermal and/or electrooptical tuning element for fine tuning the wavelength ratios during the down-conversion, and at least the first waveguide has an associated electrooptical device for adjusting the relative phase relationship between the horizontally and the vertically polarized states present at outputs associated to the separating device.

In the device according to the invention, all the required components for generating the polarization-entangled photons are unified in one substrate; this substrate or this chip is made e.g. of lithium niobate and has a length of merely approximately 7 cm to 8 cm (approximately 3 inches). This compact design furthermore has the advantage that re-adjustments, e.g. in case of shocks or vibrations, are not required, contrary to the photon sources according to the prior art.

In order to distribute the pump photons "shot" (injected) into the substrate (subsequently also termed "wafer") accordingly to the two PPLN waveguides, for generating the horizontally and vertically polarized photons, the beam splitter formed in the substrate may comprise a waveguide arrangement with two waveguides to which the two waveguides—which may be connected in parallel—are connected. In this respect, it is furthermore suitable if two adjacently arranged waveguides are formed in the substrate for the purpose of beam splitting, which waveguides have an associated electronic tuning device, and one of which is connected to an input waveguide for supplying the pump photons. Such a beam splitter design additionally is amenable to the desired separate design of the device, yet using merely one wafer.

It ought to be mentioned that, e.g. from the article by Leon McCaughan, "Low-Loss Polarization-Independent Electrooptical Switches at λ=1.3 μm", Journal of Lightwave Technology, vol. LT-2, No. 1, February 1984, pp. 51-55, a comparable switch or splitter arrangement with waveguide configurations is known, however for the purpose of providing electrooptical switches or modulators, respectively.

In the beam splitter, the distribution of the pump photons for the conversion into vertically polarized photons (in one or "the first" PPLN waveguide), and into horizontally polarized photons, respectively (in the other or "the second" PPLN waveguide) at a ratio of approximately $(d_{eff}^H L_H)^2:(d_{eff}^V L_V)^2$ can be provided (this ratio corresponds to the inverse ratio of the conversion efficiencies (Equation (3)) in the respective PPLN waveguides with the lengths $L_V$ and $L_H$. Of course, this ratio will depend on the respectively used substrate material, wherein, provided that $L_V=L_H$, a ratio of approximately $1:7^2$ will result for z-cut lithium niobate wafers, as will be explained hereinafter in more detail.

The wavelength filter by which the signal photons and the idler photons, which have different wavelengths, are separated from each other, is suitably polarization-independent, in order to pass therethrough both vertically polarized photons and horizontally polarized photons, irrespective of their polarization. To simplify the waveguide design, it is furthermore suitable if the wavelength filter is connected to a unifying waveguide that forms the unifying path in the substrate. Furthermore, a particularly effective realization of the wavelength filter will result if a common starting portion of the unifying waveguide passes through the wavelength filter region in the substrate and if, adjacent thereto, a coupling waveguide is formed in the wavelength filter region in the substrate.

A particularly suitable, robust waveguide structure capable of guiding both TM modes and TE modes with good effectiveness is obtained by a ridge-type waveguide which, moreover, if an electrode is mounted, is also amenable to electric fine-tuning. It should be mentioned here that as such, a ridge waveguide is known e.g. from the article by Masaki Asobe et al., "A Highly Damage-Resistant Zn:LiNbO₃ Ridge Waveguide and its Application to a Polarization-Independent Wavelength Converter", IEEE Journal of Quantum Electronics, vol. 39, No. 10, October 2003, pp. 1327-1333. There, the high resistance to optically induced damage at high intensities of the pump field, on the one hand, and a stable parametric amplification, on the other hand, are pointed out, yet this ridge waveguide is merely described in the context of a wavelength converter (frequency converter).

Another possibility for forming the PPLN wave-guides, at least the second waveguide, is the—per se known—provision of a diffusion zone within the substrate, wherein there, too, an advantageous electrical tuning is possible when mounting an electrode above the diffusion zone which forms the waveguide, with an insulating layer interposed.

In the present device it is, furthermore, provided for generating the signal photons, and the idler photons, respectively, in the two waveguides each with the same signal wavelength, on the one hand, and idler wavelength, on the other hand, by choosing the poling periods and poling orders of the periodically poled substrate areas. In other words, on the one hand, the vertically polarized signal photons and the horizontally polarized signal photons have the same wavelengths, and, on the other hand, also the vertically and horizontally polarized idler photons have the same wavelengths.

For an efficient tuning of the device when generating the polarization-entangled photons, the substrate can be connected to a heating element, such as a Peltier element, on the one hand, provided for thermal tuning, and, on the other hand, as already suggested before, at least the other (second) waveguide may have associated tuning electrodes for tuning, wherein, by applying an appropriate electric field, the effective refraction index of the other waveguide is adapted. An advantageous arrangement results if an earth potential electrode is arranged above the other waveguide, adjacent to which an electrode is provided which is connected to a direct current (DC) potential when in operation. In the case of a diffusion zone waveguide, if a lithium niobate substrate is provided, the or each waveguide can be formed by diffusion or doping with titanium (Ti) or zinc (Zn).

BRIEF DESCRIPTION OF THE DRAWINGS

The invention will now be described in more detail by way of preferred exemplary embodiments schematically illustrated in the drawings, to which embodiments, however, the invention shall not be restricted. In detail, in the drawings, FIG. 1 schematically shows a quantum-cryptographic connection between two partners.

DETAILED DESCRIPTION OF PREFERRED EMBODIMENTS

Figure 1:
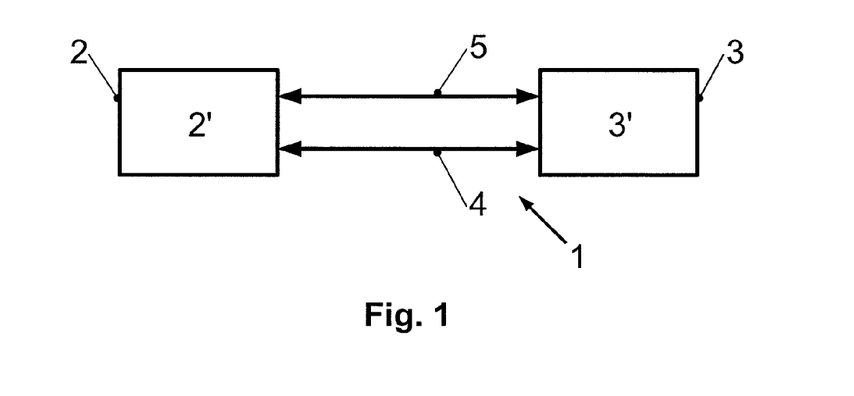

In FIG. 1, a conventional quantum-cryptographic connection 1 with two partners 2, 3 with appropriate apparatus 2' and 3', respectively, is shown, wherein an optical quantum channel 4 is provided between the two partners or stations 2, 3, on the one hand, and a classical, public data channel 5 is provided, on the other hand. The quantum channel 4 may, e.g., be formed by a fiberglass line or by the free space, wherein, in both instances, appropriate sending and receiving devices are provided in the apparatus 2', 3'. In the literature, the stations 2, 3 are usually termed ALICE-component, and BOB-component, respectively, and a position trying to eavesdrop on the quantum channel 4 via which the crude key is exchanged, usually is termed EVE in the literature (pun, in analogy to "eavesdropper"). An explanation in greater detail particularly with regard to the design of the individual components as well as to the physical procedures, also in the case of an eavesdropping attempt, is not necessary in view of the literature already mentioned. In the following, only the general set-up of such a station 2 or 3 shall be explained quite generally by way of FIG. 2 in more detail.

Figure 2:
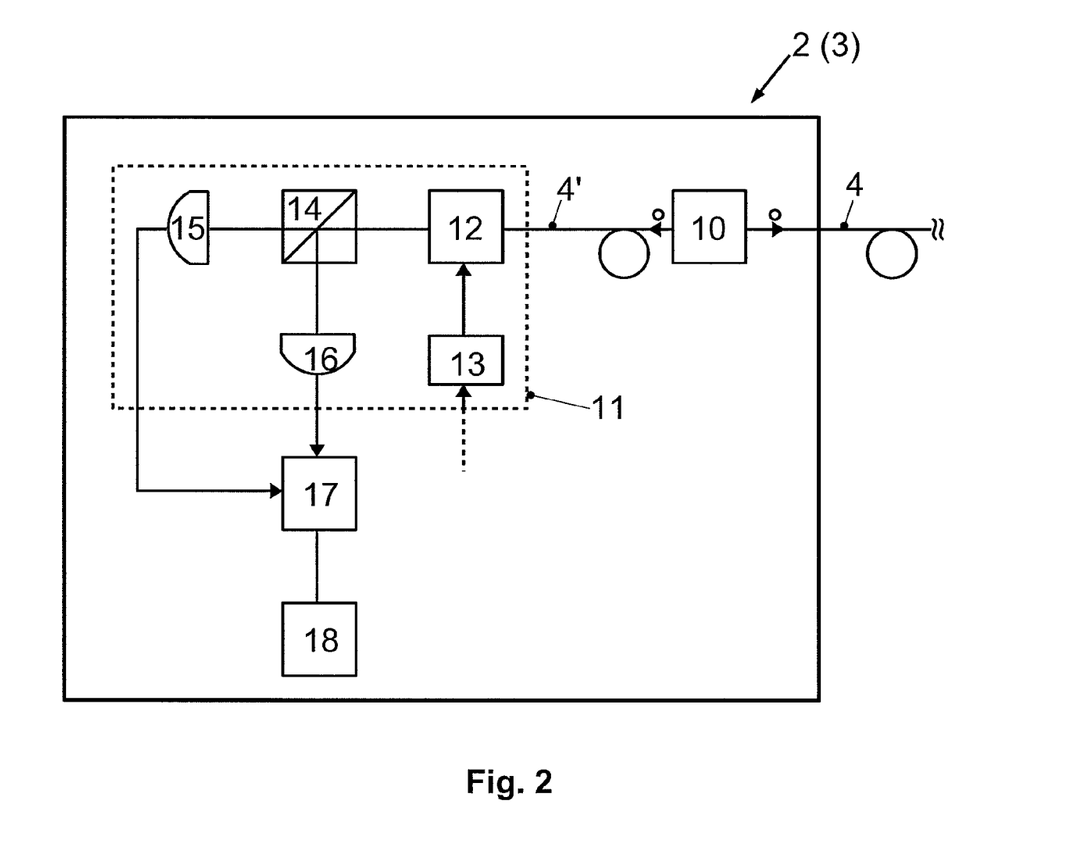
FIG. 2 schematically shows the essential quantum-cryptographic devices provided in a user (subscriber) station in case of generating entangled photons, in a type of block diagram.

Accordingly, FIG. 2 shows such a station 2 (or 3) which contains the quantum-optic means associated to a quantum channel 4, via which the quantum information is exchanged in the form of optic photons. In detail, a photon pair source 10 is provided in this station 2. Via an internal quantum line 4', this photon pair source 10 is furthermore connected to a photon detector 11 within the station 2 (a correspondingly set-up detector is present in the partner station, e.g. 3).

At its input side, the detector 11 contains an active polarizer 12 to which a corresponding setting signal is supplied via a control unit 13. The respective photon will then get to a polarizing beam splitter 14 which is followed by two avalanche photodiodes 15, 16, to whose outputs an analysis unit 17, e.g. a time interval analyzer, is connected. Besides, the further common communication control units are combined together with a switching module 18.

The photon pair source 10 is constructed with a pump beam laser in conventional manner, wherein the pump beam is supplied to a wafer 20 (cf. FIG. 3) so as to generate therein the entangled photons or "qubits".

According to FIG. 3, the wafer or chip 20, i.e. the substrate 20, contains a waveguide arrangement or structure 21 with various waveguides which will be explained hereinafter in more detail with respect to their mutual association and with respect to their function. A pump beam 22 is supplied to the substrate 20 and, thus, specifically to an input waveguide 23, i.e. photons are shot into the crystal in this manner so as to obtain subsequently the photon pairs, or entangled photons, respectively, by photon decay. This mechanism is known per se and shall merely be briefly hinted at here.

The chip, or the substrate 20, respectively, consists of a material having sufficiently large non-linear coefficients $d_{33}$ and $d_{31}$, wherein preferably, a z-cut lithium niobate ($LiNbO_3$) is used. The c-crystal axis of the material extends in parallel to the z-axis (cf. the axis designations in FIG. 3 at the bottom left corner which indicate the coordinate system of the chip). Within the substrate or wafer 20, there are two regions 24, 25 where the crystal material is periodically poled. The poling periods are denoted by $\Lambda_V$ and $\Lambda_H$ (with v—vertical and H—horizontal). The lengths of these regions 24, 25 are indicated by $L_V$ and $L_H$, respectively. A waveguide 26 (which, in operation, carries vertically polarized pump, signal and idler photons) and a waveguide 27 (which, in operation, carries vertically polarized pump photons and horizontally polarized signal and idler photons) extend through these regions 24, 25, wherein the in FIG. 3 upper waveguide 26 also is termed "first" waveguide 26 and the other, in FIG. 3 lower waveguide 27 is termed "second" waveguide 27. To simplify matters in FIG. 3, the re-poled partial regions (not further designated) have been indicated in hatching in the regions 24, 25. Moreover, in the region 25 which is illustrated at the bottom in FIG. 3 and belongs to the second waveguide 27, a two-dimensional electrode 28 is provided, cf. also FIG. 4, which in the example illustrated is connected to a DC voltage $U_d$ (in a typical order of approximately 10V); furthermore, next to it—entered in FIG. 3 thereabove—an electrode 28' is provided which is connected to ground. This electrode pair 28, 28' is used for the fine tuning of the further or second waveguide 27 which will be explained hereinafter. Moreover, a further electrode 29 is mounted above the first-mentioned waveguide 26, and is supplied with a DC voltage $U_\phi$, which electrode 29 serves for electrooptically adjusting phase $\phi$ (cf. Equation (4)). It appears suitable to place this electrode 29 with a typical length of a few millimeters above the waveguide 26: due to the space required, the maximum possible length $L_V$ of the periodically poled range 24, in which the down-conversion occurs, is reduced; yet, since the transition probability per length unit during the generation of vertically polarized photons in z-cut $LiNbO_3$ is higher by approximately a factor of 7 than for the horizontally polarized photons, the losses in efficiency are lower than if the electrode 29 were mounted above the waveguide 27.

Figure 3:
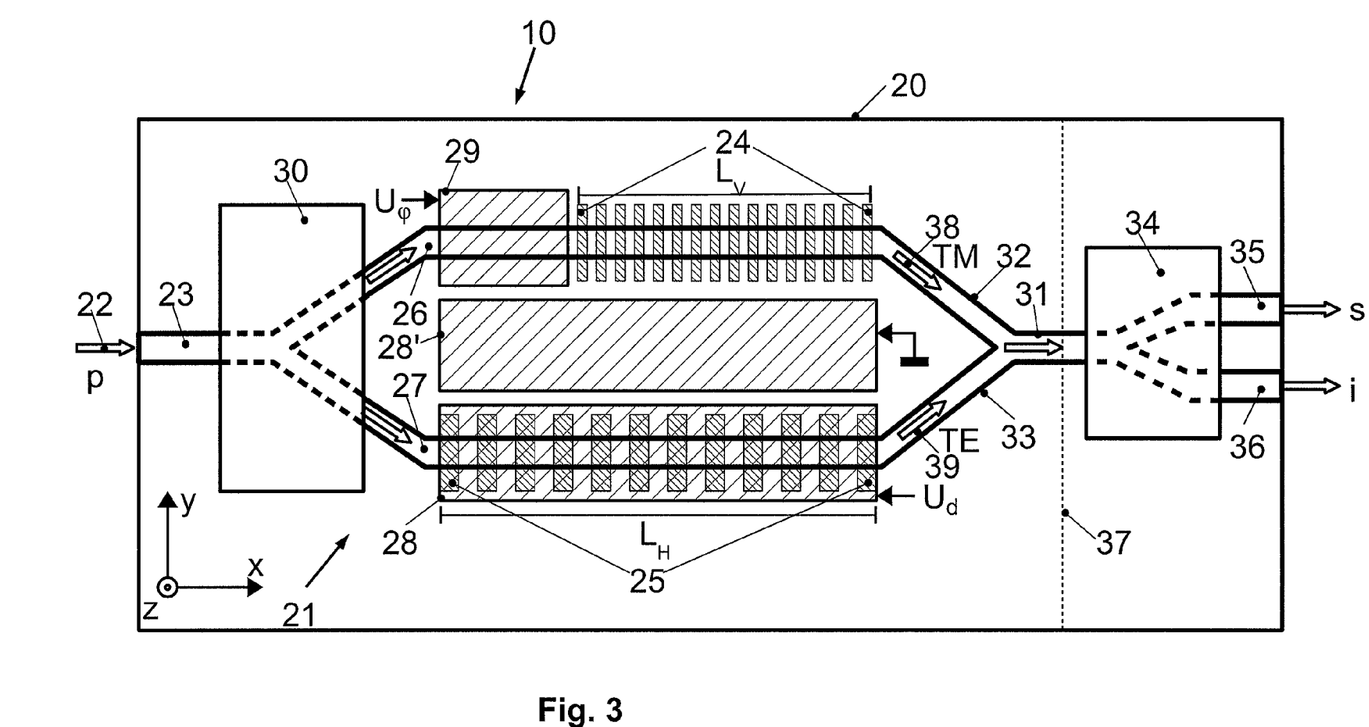
FIG. 3 shows a schematic top view onto a device for generating entangled photons by using a single substrate or wafer with waveguide components formed therein.
Figure 6:
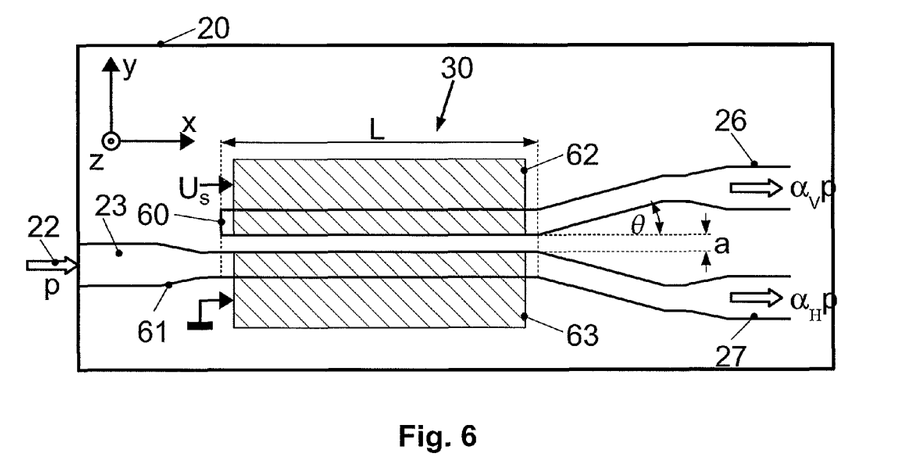
FIG. 6 shows a partial top view onto such a substrate of the device according to FIG. 3, wherein in FIG. 6 a design of the beam splitter is shown in more detail.

The two waveguides 26, 27 follow the input wave-guide 23 via a beam splitter 30 which is schematically indicated in FIG. 3 by a Y-waveguide. In a preferred exemplary embodiment, this beam splitter 30 may be formed as illustrated in FIG. 6, as will be explained in more detail further below.

Via wave-guides 32, 33 meeting in a unifying waveguide 31, the two waveguides 26, 27 are connected to a wavelength filter 34 which has two waveguide outputs 35, 36 for delivering signal photons s, on the one hand (e.g. with a vacuum wavelength of $\lambda_s = 2\pi c/\omega_s = 1.55$ μm, at a pump wavelength of $\lambda_p = 0.532$ μm), as well as idler photons i, on the other hand (e.g. with a vacuum wave length of $\lambda_i = 2\pi c/\omega_i = 0.81$ μm at the same pump wavelength). These idler photons i are used for measurement purposes in quantum cryptography, whereas the signal photons serve to generate a key, as is known per se.

In the following, a preferred embodiment of the wavelength filter 34 will be explained in more detail by way of FIG. 7. It should be mentioned that the wavelength filter 34 with the output waveguides 35 and 36 can be replaced by external fiber-optic or waveguide-based components, as indicated in FIG. 3 by a dashed separating line 37. In this case, the signal and idler photons are directly coupled, by the waveguide 31, into the external wavelength filtering device.

In operation, a vertically polarized pump beam 22 with pump photons p, with the (angular) frequency $\omega_p$, is shot into the input waveguide 23 provided at the surface of the substrate 20. In the waveguide 23, the TM base mode is excited. Preferably, the side face or facet of the chip 20 may have an anti-reflexion coating so as to improve the coupling effectiveness when supplying the pump photons.

In the beam splitter 30, the guided optical pump field is then split into the two TM base modes which are supplied to the two periodically poled waveguides 26, 27. For this purpose, the beam splitter 30 can be electrically tunable. The energy portions for the waveguides 26, 27, based on the optical energy within the waveguide 23, shall be denoted by $\alpha_V$ and $\alpha_H$ here.

In the upper waveguide branch (first waveguide 26), a parametric type I-down-conversion $\omega_p^V \rightarrow \omega_s^V + \omega_i^V$ will occur, i.e. vertically polarized signal photons and also vertically polarized idler photons will be obtained. This splitting is mainly determined by the repoling period $\Lambda_V$ and the poling order $m_V$, since the conservation of energy and quasi-phase matching conditions must apply:

$$\frac{\omega_p^V}{c}\bar{n}_p^V = \frac{\omega_s^V}{c}\bar{n}_s^V + \frac{\omega_i^V}{c}\bar{n}_i^V + m_V\frac{2\pi}{\Lambda_V}, \omega_p^V = \omega_s^V + \omega_i^V$$

Accordingly, for the second waveguide 27 entered at the bottom in FIG. 3, with the type-I down-conversion $\omega_p^V \rightarrow \omega_s^H + \omega_i^H$ occurring therein (horizontally polarized signal and idler photons are obtained), the following holds according to the conservation of energy principle and the quasi-phase matching condition:

$$\frac{\omega_p^V}{c}\bar{n}_p^V = \frac{\omega_s^H}{c}\bar{n}_s^H + \frac{\omega_i^H}{c}\bar{n}_i^H + m_H\frac{2\pi}{\Lambda_H}, \omega_p^V = \omega_s^H + \omega_i^H.$$

The poling periods and orders in the regions 24, 25 are chosen such that the angular frequencies (or wavelengths $\lambda=2\pi c/\omega$) of the signal photons generated, on the one hand, and also of the idler photons, on the other hand, are equal, i.e. there applies $\omega_s^V = \omega_s^H$, or $\omega_i^V = \omega_i^H$, respectively.

According to an approximation with a plane wave, this condition can be met for $\Lambda_V \sim 7.4$ μm, $m_V=1$ and $\Lambda_H \sim 140$ μm, $m_H=-1$ with wavelengths for the pump, signal and idler photons, or fields, respectively, of 0.532 μm, 1.55 μm and 0.81 μm.

Figure 4:
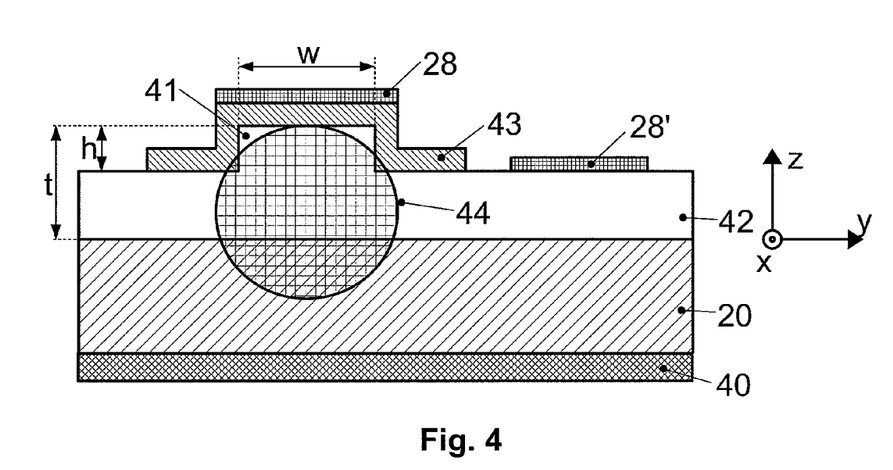
FIG. 4 shows a cross-section through a part of such a substrate in the region of what is the lower waveguide in FIG. 4, wherein a ridge waveguide is illustrated as an example.
Figure 5:
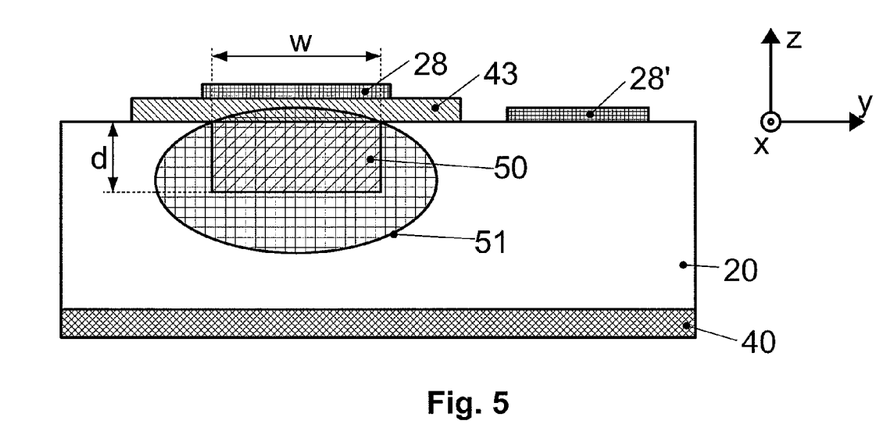
FIG. 5 shows a diffusion waveguide structure in a cross-section similar to that of FIG. 4.

According to the manufacturing tolerances, the splitting of the wavelengths, or photons, respectively, in the down-conversion process may somewhat differ. In order to balance this, the different temperature-dependencies of the effective refraction indexes $\bar{n}^V$ and $\bar{n}^H$ (which are dominated by the extraordinary, or ordinary refraction index, respectively), which are different by a factor of approximately 11 in the z-cut lithium niobate, can be utilized. For this purpose, a thermal tuning may be provided, wherein a typical resultant thermal tuning degree may be $d\lambda_s^H/dT \approx 1.7$ nm/K, with $d\lambda_s^V/dT \approx 0$. For this thermal tuning, a heating element 40, as indicated in FIGS. 4 and 5, may be provided at the lower (bottom) side of the substrate 20, this heating element 40 in particular being formed by a Peltier element which is connected to corresponding control terminals (not illustrated) in a manner known per se.

In addition thereto or thereinstead, fine tuning may also be carried out by using the electrooptical effect with the help of a static electric field which is generated between the electrodes 28, 28' according to FIG. 3, wherein changes of the effective refraction indexes due to an electric field in z-direction may, e.g., be effected according to the relationship $\Delta\bar{n}^V:\Delta\bar{n}^H=r_{33}:r_{13}\approx 3.5:1$.

For the operation of the device 10, it may be assumed that the keying ratios of the ± polarized domains in the regions 24, 25 are chosen to be optimal, i.e. with a ratio 1:1 for $m=\pm 1$, and that there is a negligible exhaustion of the pump wave, or pump photons, respectively. Since equal generating rates for the vertically polarised and horizontally polarised photon pairs are desirable (the constant |A| in the condition vector indicated in Equation 4 should be "one"), the beam splitter 30 responsible for the portions $\alpha_V$ and $\alpha_H$ can be adjusted accordingly. In case of a z-cut lithium niobate material, $\alpha_V:\alpha_H=(d_{eff}^H L_H)^2:(d_{eff}^V L_V)^2=(d_{31}L_H)^2:(d_{33}L_V)^2$ is arranged.

Accordingly, the splitting ratio at the beam splitter 30 is chosen to be $\alpha_V:\alpha_H \approx (L_H/(7L_V))^2$. Due to the space required by the electrode 29 for electrooptically adjusting the phase $\phi$ of a few millimeters up to one centimeter, the length of the periodically poled region 24 will be shorter than the length of the region 25. Consequently, the asymmetry in the splitting of the pump photons supplied to the input waveguide 23 into pump photons guided in the first waveguide 26, or in the second waveguide 27, respectively, will be reduced. The down-converted optical fields 38, 39 at the output of the re-polable waveguides 26, 27 (TM-polarized or TE-polarized, respectively) are united in the waveguide 31, as mentioned before, whereupon the united photons pass through the polarisation-independent wavelength filter (splitter) 34, where the signal field (signal photons s) and the idler field (idler photons i) are spatially separated to the output waveguides 35, 36. The signal photons s and the idler photons i are coupled-in in separate optical light guides. Here, too, the facets of the waveguides 35, 36 may be provided with an anti-reflexion coating effective for the wavelengths $\lambda_s$ and $\lambda_i$, respectively.

The overall waveguide arrangement 21 formed in the substrate 20 and used in the device 10 shall efficiently guide both TM modes and TE modes. With the commonly used lithium niobate waveguides, which are defined by means of the proton exchange method, this is not easily possible, since in that case there exists no guiding mechanism for the TE polarization. For an adaptable possibility of distributing the optical mode field in the waveguides largely via geometric parameters a design as ridge-type waveguides proves suitable in the present device, in which the ridge waveguides may be formed on the basis of an epitaxially grown thin lithium niobate layer. In FIG. 4, such a ridge waveguide design is shown for the instance of the second waveguide 27, wherein one ridge 41 is provided on the upper side of the substrate, or on a zinc-doped epitaxial layer 42 of the substrate, respectively. Above this ridge 41, the electrode 28 is mounted with a dielectric layer (insulating layer) 43 interposed, and next to it, there is the electrode 28' on the upper side of the substrate 20, or more precisely, of the epitaxial layer 42. The ridge 41 has a height h and a width w. The substrate 20 proper has a refraction index which is lower than that of the epitaxial layer 42 so as to ensure that the optical field is guided in z-direction. As the substrate material, magnesium-doped lithium niobate may be used which has a refraction index that is lower than that of undoped lithium niobate. In the case of the zinc-doped epitaxial layer 42 (Zn doped LiNbO$_3$), both the ordinary and the extraordinary refraction index can be increased by approximately 0.5%. A lateral restriction of the optical field, i.e. a guidance of the modes in y-direction, is achieved by the formation of the rib 41 with the width w and the height h. The mode field pattern 44 of the TM and TE modes guided in the waveguide 27 can be determined by appropriately choosing the geometric parameters h, w as well as also t (height of the original epitaxial layer 42, a part of which will be ablated at the surface so as to form the ridge 41). Suitably, the waveguide 27 is dimensioned such that at the longest wavelength (i.e., the signal wavelength, 1.55 μm in the example described), it will guide only a single mode. Moreover, any deviation from the circular cross-sectional shape of the pattern 43 should be as little as possible so as to attain a low-loss transition from the or to the connected light guide (fiberglass cable) when coupling in and also when coupling out the photons.

The dielectric spacing, separating or insulating layer 43 has the purpose of avoiding waveguide losses due to an absorption in the metal of the electrode 28, and this layer 43 can be deposited in a per se conventional manner on the ridge 41 and laterally thereof so as to minimize an overlap of the mode field 44 with the metal electrode 28. As the material for this layer 43, silicon dioxide can be chosen which, on the one hand, has a good transparency at the wavelengths of interest here and, on the other hand, has a refractory index that is far lower than that of $LiNbO_3$. Since the electrical field formed in operation between the electrodes 28, 28' modifies the refractory indexes $n_o$ and $n_e$ of the epitaxial $LiNbO_3$ film layer 42 by various amounts, the effective refractory index can be tuned accordingly for the TE mode (which is dominated by $n_o$) and for the TM mode (which is mainly determined by $n_e$). This is mainly important for the region 25 according to FIG. 3.

Apart from the ridge waveguides, as shown in FIG. 4, also other kinds of waveguides may be used. In a cross-section corresponding to FIG. 4, FIG. 5, e.g., illustrates a waveguide structure formed by the diffusion of titanium or zinc into the substrate material, e.g. also specifically for the second waveguide 27 according to FIG. 3. In detail, a region 50 having a width w and a depth d is formed in the lithium niobate substrate 20, in which region an increased refraction index is achieved by diffusing Ti or Zn thereinto so that a waveguide core is obtained. The mode field pattern 51 obtained in this case will depend on the parameters w, d, and is approximately elliptical in cross section in the example illustrated. Since, however, the profile of the increase in the refraction index usually decreases exponentially with the depth in the substrate 20 (i.e. with the negative z-direction), the optical modes will be shifted more deeply into the substrate 20 in case of greater wavelengths than the modes with shorter wavelengths. Accordingly, the modal overlap of the pump, signal and idler waves is reduced, causing a reduced efficiency during the down-conversion. Moreover, equal mode sizes are only hardly attainable for the TE and TM polarized modes, since the changes in the refraction indexes $n_o$ and $n_e$, as a consequence of the doping substances diffused in, will depend on the process parameters prevailing during the diffusion process; moreover, the attainable refraction index contrast is smaller for $n_o$ than for $n_e$, resulting in a less pronounced guidance of the TE modes. Nevertheless, also with this technology electrically tunable waveguides can be produced (such as, in particular, the second waveguide 27), wherein, as is furthermore visible from FIG. 5, again the electrodes 28, 28' are provided for this purpose in the arrangement already described; the electrode 28 above the region 50 for the waveguide 27 again is separated from the substrate 20 by a dielectric layer 43 which, again, preferably is made of silicon oxide.

As already mentioned before, in FIG. 6 an embodiment for the beam splitter 30 according to FIG. 3 is schematically illustrated. On the surface of the $LiNbO_3$ substrate 20, two waveguides 60, 61 are formed, wherein one waveguide 61—according to the FIG. 6 illustration the lower waveguide—directly adjoins the input wave-guide 23 (cf. also FIG. 3) and, thus, receives the supplied pump photons p. The two waveguides 60, 61 are separated from each other by a pre-determined small distance a. By this slight distance a between the two waveguides 60, 61, a slight (loose) coupling of the basic modes is achieved. At the output, the portions $\alpha_V$ and $\alpha_H$ are obtained according to the chosen spacing a as well as to the waveguide design. If the two wave-guides 60, 61 are identical in the coupling area, the performance in the upper waveguide 60 relative to the input performance will be sine-shaped, as a function of the x-coordinate, and will also depend on the coupling length (which is that length at which the optical output (power) will be completely transferred from the waveguide 60 into the lower waveguide 61), with the coupling exponentially decreasing with an increasing distance a. In waveguide designs as previously explained by way of FIGS. 4 and 5, coupling lengths of a few mm can be achieved.

Above the waveguides 60, 61, electrodes 62, 63 are arranged which, similarly as the electrodes 28, 28' according to FIG. 3, are connected to a DC voltage source $U_s$ (e.g. in the order of 10 V), and to ground, respectively. The static electric field generated thereby in the waveguides 60, 61 causes a detuning of the waveguides 60, 61 relative to each other due to the electrooptical effect, the respective refraction index being changed, e.g. in the order of approximately $10^{-4}$. With this, the splitting of the portions $\alpha_V$ and $\alpha_H$ of pump photons in the waveguides 60 and 61 can be adjusted. It is suitable if in the coupling section having the length L, the waveguides 60, 61 are narrower than externally thereof so as to achieve a larger overlap of the optical fields, on the one hand, and, thus, a decrease in the coupling length, and, on the other hand, a suppression of the excitation of parasitic modes of higher order. The transition of the optical fields between the wider and the narrower waveguide portions is adiabatic. In order to avoid waveguide losses in the obliquely drawn waveguide portions, the angle of inclination θ must be kept as small as possible (typically in the range of 1° or less). It should be noted that besides the formation of the exemplary beam splitter 30 described above, also other configurations, such as asymmetrical Y-couplers with electrooptical control means, are possible in analogy to the configuration described above.

Figure 7:
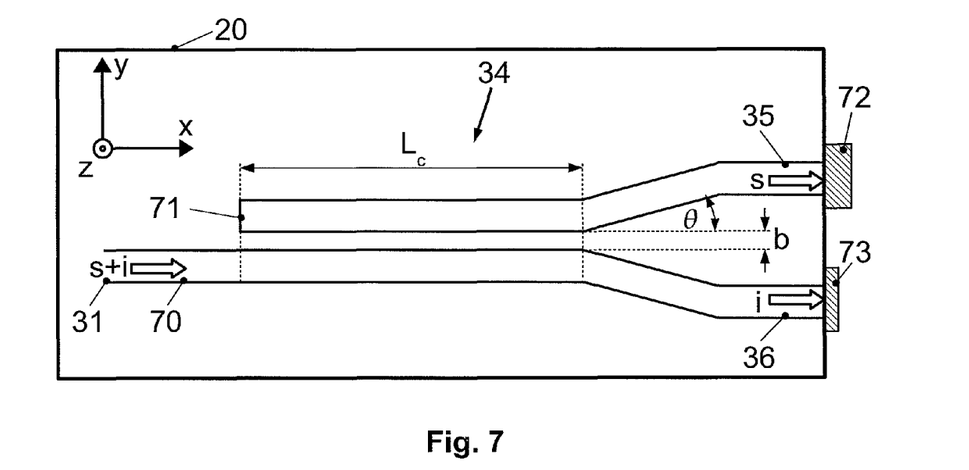
FIG. 7 shows the design of a wavelength filter with waveguides in a similar partial top view.

The polarization-independent wavelength filter 34 according to FIG. 3 may be designed as schematically shown, e.g., in FIG. 7. On the upper side of the substrate 20, a coupler-type waveguide arrangement comprising two waveguides 70, 71 is provided which are spaced apart by a small distance b. The length of the coupling area corresponds to the coupling length $L_c$ at the signal wavelength $\lambda_s$ (e.g. 1.55 μm)—i.e. that length at which the signal photons are completely coupled from the one—in FIG. 7 lower—waveguide 70 into the other, upper waveguide 71. At the input side, the unifying wave guide 31 explained in connection with FIG. 3 is present, which supplies the signal photons s and the idler photons i with the corresponding vertical and horizontal polarizations. The lower waveguide 70 thus constitutes an extension or an output portion of the unifying waveguide 31 through the wavelength filter region 34 in the substrate 20, whereas the other, upper waveguide 71 forms a coupling waveguide, use being made of the fact that the coupling strength increases exponentially with increasing wavelength. The more pronounced coupling for larger wavelengths is due to the deeper penetration of the mode field pattern into the layer material at greater wavelengths. Since the waveguides 70, 71 cause a rather weak conduction of waves, the coupling lengths are approximately equal for the TE(H) polarization and the TM(V) polarization—with the proviso that the guidance of the TE and the TM modes is approximately equally pronounced, which is the case for ridge waveguides according to FIG. 4. In this way, in the given example of signal wavelengths $\lambda_s=1.55$ μm and idler wavelengths $\lambda_i=0.81$ μm, the signal field, i.e. the signal photons, is almost entirely coupled into the coupling waveguide 71, whereas the idler field, i.e. the idler photons, remain(s) within the waveguide 70.

For an efficient out-coupling of the separated wavelengths, i.e. signal photons and idler photons i, at the output 35 and 36, respectively, an appropriate anti-reflexion coating adapted to the respective wavelength may be provided at the side face or facet of the waveguide, as illustrated at 72 and 73, respectively, in FIG. 7. For these anti-reflection coatings 72 and 73, respectively (as also for the previously already mentioned input-side anti-reflection coating not further illustrated in the drawing) silicon oxide may be used.

As an alternative to the wavelength coupler described in FIG. 7 as a wavelength filter, also polarization-independent multimode interference devices (MMI devices) or fiber-optical components may be used, such as are employed in optically pumped erbium-doped fiberglass amplifying means.

What is claimed is:

1. A device for generating polarization-entangled photons from pump photons by parametric down-conversion, comprising:
    a substrate;
    a waveguide structure formed in said substrate, said waveguide structure including a first and a second waveguide, and being comprised of an optically nonlinear material with periodically poled substrate areas;
    a beam splitter receiving said pump photons and arranged to supply a portion of pump photons to said first waveguide and a residual portion of pump photons to said second waveguide during operation of said device; said pump photons degenerating to vertically polarized signal and idler photons in one of said first and said second wave-guides, and to horizontally polarized signal and idler photons in said other one of said first and said second waveguides;
    a unifying path provided downstream of said first and second waveguides, and arranged to receive and conduct both the signal photons and the idler photons;
    spectral separating means provided downstream of said unifying path and arranged for spectral separation of said signal photons and said idler photons and providing them at separate outputs,
    at least one of thermal and electrooptical tuning means associated to at least said second one of said first and said second optical waveguides for fine-tuning wavelength ratios during said down-conversion; and
    electrooptical means associated to at least said first one of said first and said second waveguides for adjusting the phase relationship between said horizontally polarized photon states and said vertically polarized photon states prevailing at said outputs of said separating means.

2. The device of claim 1, wherein said beam splitter comprises a waveguide arrangement comprising two beam splitter waveguides, and wherein said first and said second waveguides are parallel-circuited, and are respectively connected to said two beam splitter waveguides.

3. The device of claim 2, further comprising an electrooptical tuning element provided in said substrate and associated to said beam splitter for adjusting the ratio at which said pump photons supplied to said waveguide structure are distributed to said first and said second waveguides.

4. The device of claim 1, wherein the separating means comprise a wavelength filter, said wavelength filter being polarization-independent.

5. The device of claim 4, wherein said wavelength filter is connected to said unifying path, said unifying path comprising unifying waveguides provided in the substrate.

6. The device of claim 1, wherein at least said second one of said first and said second waveguides is a ridge waveguide.

7. The device of claim 1, wherein at least said second one of said first and said second waveguides is a diffusion zone waveguide.

8. The device of claim 1, wherein by selecting poling periods and poling orders of the periodically poled substrate areas, said signal photons and said idler photons in said first and said second wave-guides are each generated with the same wavelengths.

9. The device of claim 1, further comprising a heating element connected to said substrate for thermal tuning.

10. The device of claim 9, wherein said heating element comprises a Peltier element connected to said substrate.

11. The device of claim 1, wherein said substrate comprises lithium niobate.

12. The device of claim 7, wherein said substrate comprises lithium niobate and said waveguides are waveguides formed by diffusion of an element selected from the group consisting of Ti and Zn.

* * * * *